(12) United States Patent
Soohoo et al.

(10) Patent No.: US 8,639,096 B2
(45) Date of Patent: Jan. 28, 2014

(54) SYSTEM AND METHOD OF MANAGING A DIGITAL VIDEO RECORDER USING A USER TELEVISION BROADCAST LIST

(75) Inventors: Anthony Soohoo, Palo Alto, CA (US); John Russell, Palo Alto, CA (US); Kris Wainscott, Sausalito, CA (US); Jeff Clark, Tiburon, CA (US); Carlos Teran, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 690 days.

(21) Appl. No.: 12/760,361

(22) Filed: Apr. 14, 2010

(65) Prior Publication Data

US 2010/0272420 A1  Oct. 28, 2010

Related U.S. Application Data

(60) Provisional application No. 61/169,659, filed on Apr. 15, 2009.

(51) Int. Cl.
*H04N 5/94* (2006.01)

(52) U.S. Cl.
USPC ..................................... 386/291; 386/E5.003

(58) Field of Classification Search
USPC .......................................... 386/291, E05.003
See application file for complete search history.

(56) References Cited

U.S. PATENT DOCUMENTS

| | | | | |
|---|---|---|---|---|
| 7,921,071 B2* | 4/2011 | Hicks | ............................. | 706/52 |
| 2002/0174424 A1* | 11/2002 | Chang et al. | ...................... | 725/9 |
| 2003/0095791 A1* | 5/2003 | Barton et al. | ................... | 386/83 |
| 2003/0131355 A1* | 7/2003 | Berenson et al. | ............... | 725/46 |
| 2008/0134039 A1* | 6/2008 | Fischer et al. | ................ | 715/733 |
| 2008/0163307 A1* | 7/2008 | Coburn et al. | .................. | 725/61 |
| 2009/0204481 A1* | 8/2009 | Navar et al. | ..................... | 705/10 |
| 2010/0058375 A1* | 3/2010 | LaFreniere et al. | ............... | 725/9 |

* cited by examiner

*Primary Examiner* — Thai Tran
*Assistant Examiner* — Girumsew Wendmagegn
(74) *Attorney, Agent, or Firm* — Fenwick & West LLP (57) ABSTRACT

A system and method of managing a digital video recorder using a user customizable television broadcast list which includes a list of a plurality of user selected television programs being displayed on a website. The television programs on the list are identified based on date and time broadcast information which are retrieved from a storage medium. The list includes television programs only to be broadcast on a particular user selected date. At least one of the user selected television programs from the list is exported to a digital video recorder (DVR) upon the user selecting the at least one user selected television program from the list. The DVR is instructed to automatically record the television programs at a predetermined date and time based on the date and time broadcast information.

18 Claims, 6 Drawing Sheets

SYSTEM AND METHOD OF MANAGING A DIGITAL VIDEO RECORDER USING A USER TELEVISION BROADCAST LIST

STATEMENT OF RELATED APPLICATION

The present application claims the benefit of priority based on U.S. Provisional Patent Application Ser. No. 61/169,659, filed on Apr. 15, 2009, in the name of the above inventors, and entitled "System and Method of Managing a Digital Video Recorder Using a User Customizable Television Broadcast List", all commonly owned herewith.

TECHNICAL FIELD

The present disclosure relates generally to a system and method of managing a digital video recorder using a user customizable television broadcast list

BACKGROUND

In today's society, traditional television broadcasting is popular, which is evidenced by the increasing number of television channels and programs which are able to be viewed by the masses. However, with this increasing amount of content broadcast on television, traditional television guides have become too burdensome for the viewer to be able to keep up with scheduled broadcast dates and times. In addition, the increasing quality of programs which are broadcasted on television, with their differing times and channels have resulted in the user missing many programs which would have otherwise been watched. This results in declining viewership and exposure as well as ultimately declining advertising revenue.

What is needed is an easily manageable interactive website that manages and continually updates the dates, times and channels of only the programs which are of interest to the user so that viewers can keep track of when and where their preferred programs will be broadcast.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.
In the drawings.

OVERVIEW

A system and method of managing a digital video recorder using a user customizable television broadcast list which includes a list of a plurality of user selected television programs being displayed on a website. The television programs on the list are identified based on date and time broadcast information which are retrieved from a storage medium. The list includes television programs only to be broadcast on a particular user selected date. At least one of the user selected television programs from the list is exported to a digital video recorder (DVR) upon the user selecting the at least one user selected television program from the list. The DVR is instructed to automatically record the television programs at a predetermined date and time based on the date and time broadcast information.

DESCRIPTION OF EXAMPLE EMBODIMENTS

Example embodiments are described herein in the context of a system of computers, servers, and software. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

In general, the system is directed to displaying a list (hereinafter termed a "Watch List") of to-be broadcast television shows, movies, concerts, events, pay-per-view movies and events, sports, news and other content, hereinafter referred to generally as television program(s), which the user has indicated an interest in. The Watch List automatically displays all television programs (and associated broadcast information) that will be broadcast on television for particular date to inform the user of upcoming televisions programs. Accordingly, the user is able to visit the webpage controlled by the system, whereby the user is continuously informed of which programs of interest will be aired for that particular date.

Figure 1:
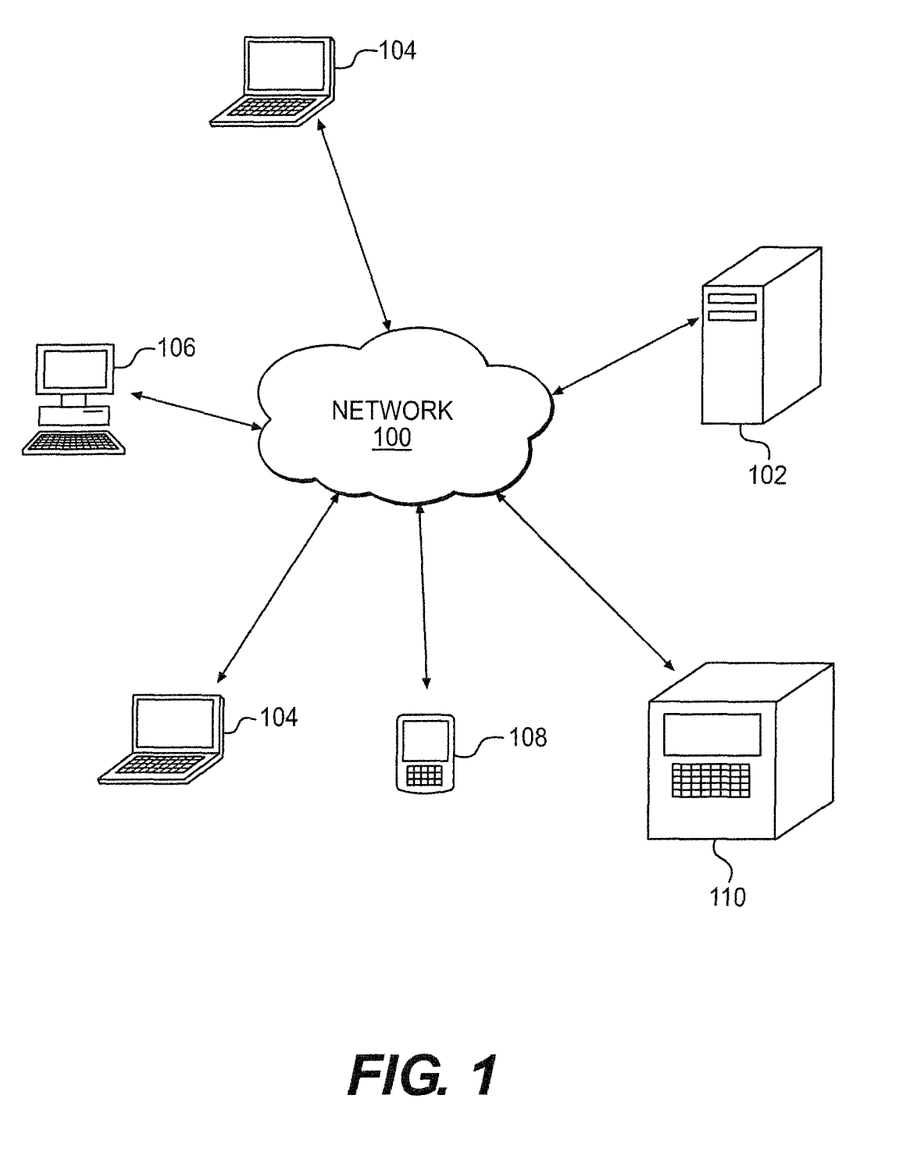
FIG. 1 illustrates a overview of the system in accordance with an embodiment.

FIG. 1 illustrates an overview of the system in accordance with an embodiment. The system includes server 102 and computer client systems 104, 106, 108, and 110 each communicatively coupled together via network 100. Computer client systems 104, 106, 108 and 110 each represents a general-purpose computer system such as, but not limited to a desktop computer, laptop computer, mobile electronic device, Smartphone, cellphone, as well as a standalone media kiosk. Each of the computer systems 104, 106, 108 and 110 is preferably equipped with a display device such as a CRT or LCD to display one or more webpages containing digital media, Watch Lists and other information that may be viewed and/or shared with one or more other computer client systems. For the purpose of this discussion, the respective users (not shown) of the computer systems 102, 104, 106 are each assumed to be resource-sharing partners with one another.

Network 100 represents any of a variety of communications networks equipped to transport data between various communication devices such as those illustrated in FIG. 1. In an embodiment, network 100 represents a transmission control protocol/internet protocol (TCP/IP) based network such as, but not limited to the Internet. In other embodiments network 100 may represent a local area network (LAN), a wide area network (WAN), or some combination thereof. In an embodiment, any one or more of computer systems 104, 106, 108 and 110 may be directly coupled to each other and/or server 102 in addition to or in place of the illustrated connections to network 100. Although four general-purpose computer systems are illustrated in FIG. 1, a fewer or greater number of computer systems may instead be coupled to network 100. The computer systems 104, 106, 108 and 110 may be connected to each other or to network via wired or wireless connection protocol.

Figure 2:
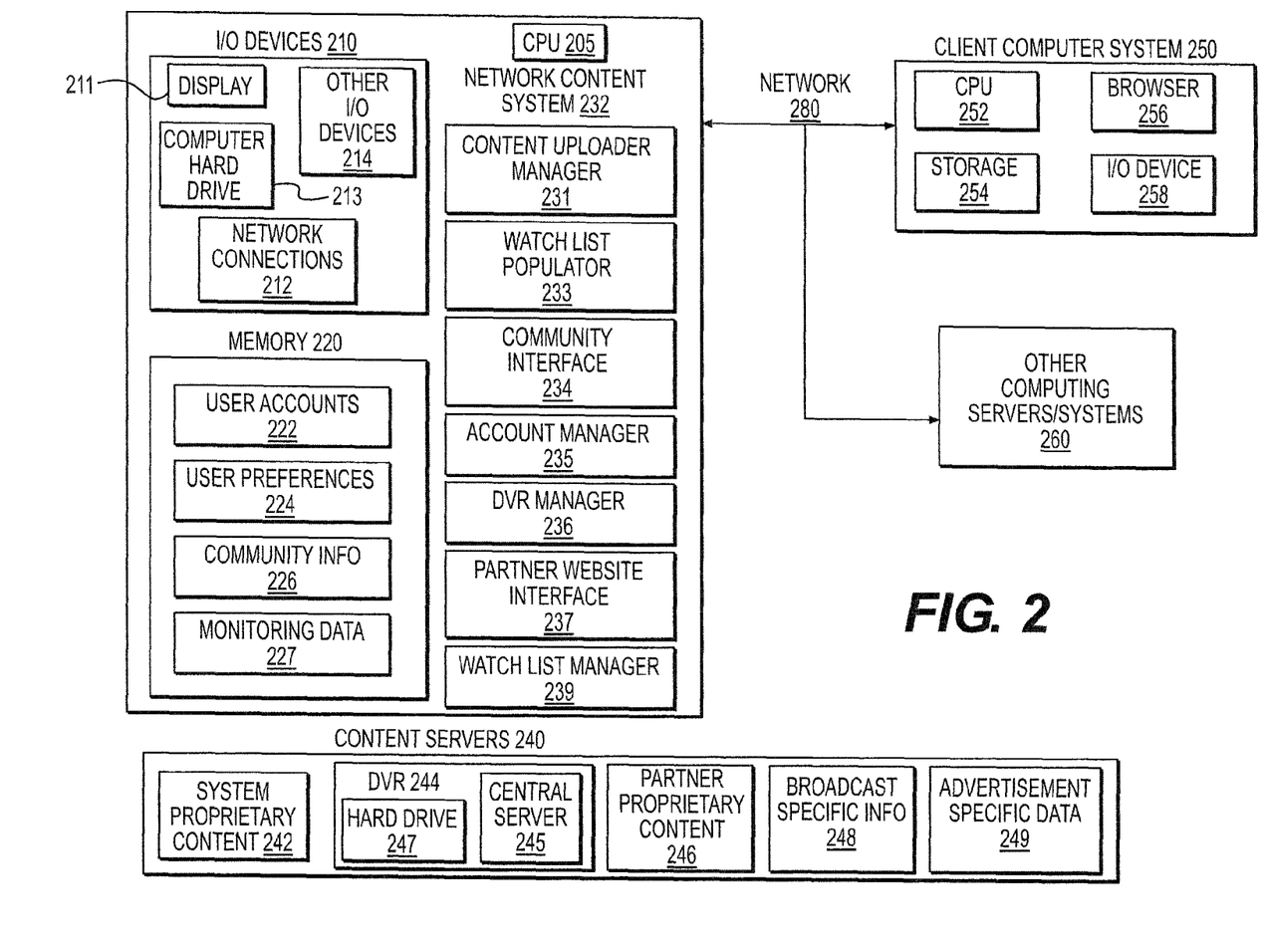
FIG. 2 illustrates a component view of the system in accordance with an embodiment.

FIG. 2 illustrates a server computing system 200 suitable for executing an embodiment of a Network Content System 232 that facilitates automatic processing and display of the Watch List and associated features of one or more users utilizing the system 200 as well as computing systems 250 of the registered users to the system 200. The Server Computing System 200 preferably includes a CPU 205, various I/O devices 210, memory 220, and the Network Content System 232. The I/O devices 210 preferably include a display 211, a network connection 212, a computer-readable media hard drive 213, and other I/O devices 214.

As shown in FIG. 2, an embodiment of the Network Content System 232 is executed in memory and preferably includes a Content Uploader component 231, a Watch List Populator component 233, an Account Manager component 235, a Partner Website Interface component 337, a Watch List Manager component 239, a Community Interface component 234 and an optional Digital Video Recorder (DVR) Manager component 236.

Those skilled in the art will appreciate that computing systems 200 and 250 are merely illustrative and are not intended to limit the scope. Computing system 200 may be connected to other devices that are not illustrated, including through one or more networks such as the Internet or via the World Wide Web ("Web"). More generally, a "client" or "server" device may comprise any combination of hardware or software that can interact, including computers, network devices, internet appliances, PDAs, wireless phones, stand-alone kiosks, cellphones, pagers, electronic organizers, television-based systems and various other consumer products that include inter-communication capabilities. For example, one of the computing systems 250 may be a cellphone, wireless PDA or other portable device. In addition, the functionality provided by the illustrated system's 232 components may in some embodiments be combined in fewer components or distributed in additional components. Similarly, in some embodiments the functionality of some of those illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system 232 components or data structures may also be stored as contents (e.g., as software instructions or structured data) of a computer-readable medium, such as a hard disk, a memory, a computer network or other data transmission medium, or a portable media article (e.g., a DVD or flash memory device) to be read by an appropriate drive or via an appropriate connection. Some or all of the system 200 and its components as well as data structures can also be transmitted as contents of generated data signals (e.g., by being encoded as part of a carrier wave or otherwise included as part of an analog or digital propagated signal) on a variety of computer-readable data transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the system 200 may be practiced with other computer system configurations.

In general, the Network Content System 232 provides, manages and processes digital content as well as the Watch List which is ultimately displayed on the user's computer client systems 250 (referred to as items 104, 106, 108 and 110 in FIG. 1). In particular, the Content Uploader component 231 uploads data from the Content Server, generally referred to as 240. For instance, the Content Uploader component 231 is able to upload data from one or more of the system's own proprietary content databases 242, from one or more users' DVR 244 (i.e. the DVR's local hard drive 247 or a central server 245 connected to the DVR), one or more Partner Proprietary Content databases 246, a Broadcast Specific database 248, and/or one or more Advertiser Specific database 249. The System 200 is preferably capable of storing and processing user account data (via Account Manager 235) from Memory component 220 which preferably contains a User Account component 222, a User Preferences component 224, and a Community Information component 226. The System 200 is preferably able to store and process user activity via the Monitoring component 228. It is contemplated that the System 200 is sufficiently robust to carry out the above actions with other computing systems to allow the System 200 to be implemented and accessed across various platforms, such as Partner websites, Partner widgets and the like.

Before viewing and managing the Watch List and its associated content from the System 200, users (e.g., users of the computing systems 250) interact with the Account Manager component 235 to create and manage user accounts with information 222 about the user accounts stored in Memory 220. Each user preferably provides name and address information as well as personalized information which may be used to enrich the users' experiences with the System 200. For instance, a user may provide preferences which are preferably stored in the User Preference component 224. Such preferences include, but are not limited to, favorite television programs or movies, favorite actors, preferred viewing channels, preferred types of television programs (e.g. comedy, drama, sports) and the like. The System 200 may then use this stored information to select and recommend television programs which may appeal to the user. The user may also indicate whether he or she subscribes to a video rental service (e.g. Netflix, Blockbuster, Amazon Video) and/or whether the user has a DVR machine, which are then preferably stored in the User Preferences component 224.

Upon setting up his or her account, the user may form a new social network circle or join an existing social network community using the System 200 via the Account Manager component 235. In particular, the user is preferably allowed to select friends who are subscribed to the System 200, whereby the System 200 stores this information in the Community Information component 226 to form a social network community where the user can communicate and share information with others in that network community via the Community Interface component 234. The user may also use the Community Interface component 234 to invite one or more friends who are not currently subscribed to the System 200, whereby the Community Interface component 234 preferably sends an invitation via email or other means to those friend(s) to subscribe to the System 200. If a social network community already exists in which one or more of the user's friends are already subscribed, the Community Interface component 234 scans and processes this data and stores such data. While the Account Manager component 235 is illustrated as part of the Network Content system 232 in this illustrated embodiment, in other embodiments some or all of the Account Manager component functionality could instead be performed by another system with which the Network Content system 232 interacts.

Upon the user's account being established, the System 200 preferably requests the user to populate the user's personalized Watch List. In an embodiment, the Watch List Populator component 233 retrieves television programs of interest to the user which are then added to the Watch List. In particular, the Watch List Populator component 233 is able to scan one or more user designated sources to retrieve those television programs which will ultimately be on the Watch List. In an embodiment, the Watch List Populator component 233 allows the user to directly enter the names of the television programs of interest, whereby those programs are then automatically added to the Watch List. In an embodiment, the Watch List Populator component 233 is authorized by the user to scan cookies to find prior searches or websites visited in the user's computer 250, whereby the Watch List Populator component 233 is able to retrieve information of potential programs of interest to the user from that scan. The Watch List Populator component 233 then preferably requests whether the user would like to add those programs to his or her Watch List. The Watch List Populator component 233 may use affinity algorithms or other intelligent analysis to choose programs similar to ones already on the Watch List to recommend to the user.

In an embodiment, the Watch List Populator component 233 may be configured to retrieve program information from the user's DVR, whereby the system automatically adds or suggests to the user to add those programs set for recording on the user's DVR that are not already on the Watch List. It is also contemplated that the Watch List Populator component 233 scans and retrieves information of the user's video rental queue via the Partner Proprietary Content database 246 and automatically adds or suggests to the user to add those programs to the Watch List. In particular, the system may scan the queue and find that the user has one or more seasons of "Lost" in his or her queue and/or DVR, whereby the system is able to place "Lost" as among the programs in that user's Watch List. For example, upon scanning the user's DVR, the system may determine that the user has set "60 Minutes" for recording on the user's DVR and automatically checks to see if "60 Minutes" is on the user's Watch List. If it is determined that "60 Minutes" is not on the user's Watch List, the system may automatically add (or request the user to add) "60 Minutes" to the Watch List. It is contemplated that the DVR functionality may be tied to programs for which all episodes are scheduled to be recorded on the user's DVR (e.g. Season Pass) and/or for programs for which only one episodes are scheduled to be recorded on the DVR.

In an embodiment, the Watch List Populator component 233 retrieves names of television programs off of Watch Lists of one or more of the user's friends and asks the user if he or she would like to add those programs to his or her Watch List. The Watch List Populator component 233 may present all programs from the friend's Watch List for recommendation or may select certain programs from the friend's Watch List based on similarities to programs that are on the user's Watch List. It is contemplated that selective filtering processes may be employed by the Watch List Populator component 233 to select these programs or take into account invitations sent from the user's friends in determining whether to recommend the program(s) be added to the user's Watch List.

In an embodiment, the Watch List Populator component 233 may scan social networks (e.g. Facebook, Friendster, MySpace) which the user subscribes to for names of television programs which the user has mentioned anywhere on the site(s), whereby the component 233 then automatically adds (or recommends to add) those retrieved programs to the user's Watch List. This feature may be utilized when the user is new to the system and would like to quickly populate his or her Watch List. This feature may also be utilized when the user has newly subscribed to a particular channel (e.g. HBO, Showtime) and would like to quickly populate his or her Watch List with programs taken from one or more friends' Watch Lists who subscribe to that channel. It is understood that access to the Watch Lists of other users would need to approved by those users prior to these features being utilized.

In an embodiment, the system may suggest programs which are found to be on a significant (or majority) of the entire community of other users' Watch Lists (within or outside the user's friend community) and recommend to add those programs to the user's personal Watch List. This feature would expose the user to programs which are popular among other users but which the user may be unfamiliar with and would potentially be interested in viewing. If authorized by the user, these recommended programs would then be automatically added to the user's Watch List.

Figure 3:
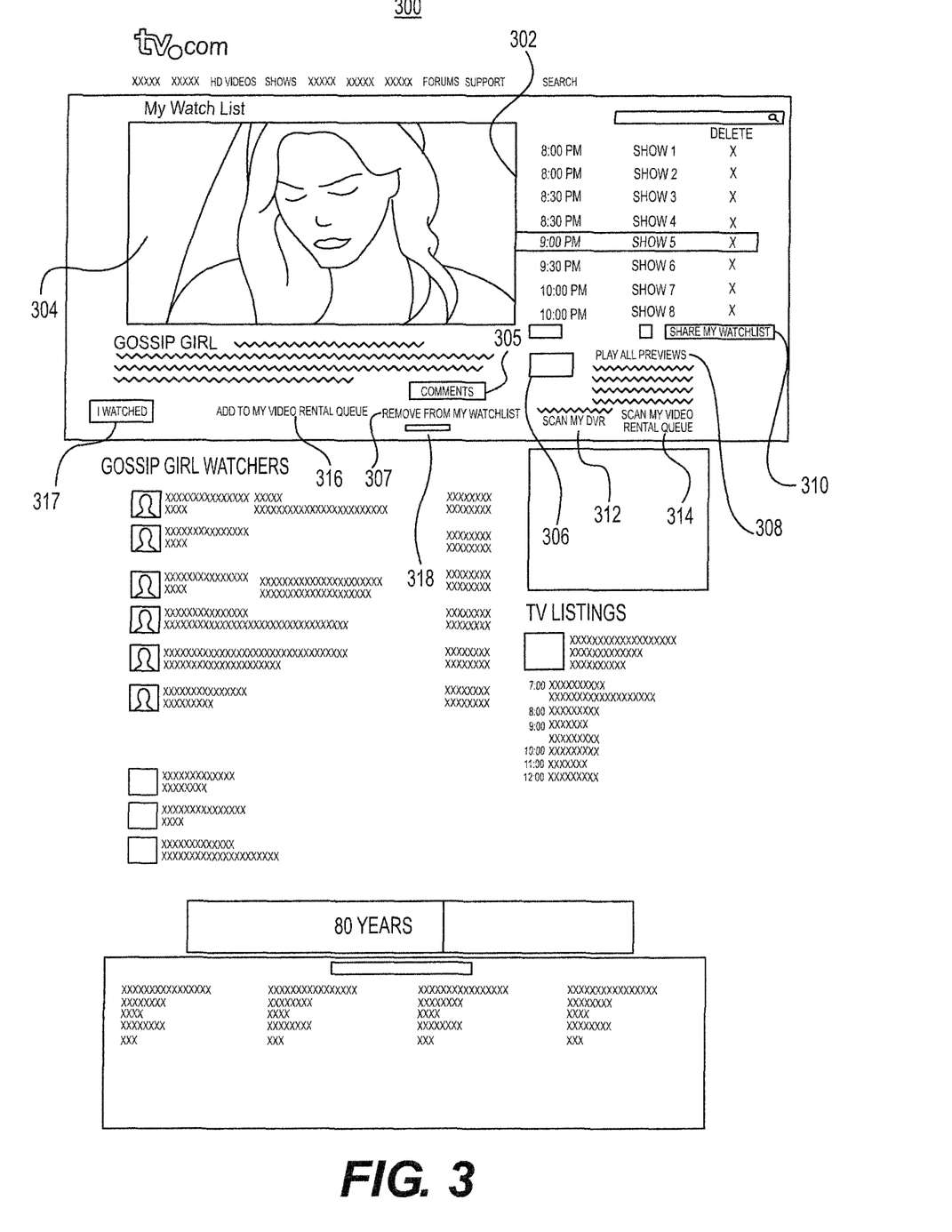
FIG. 3 illustrates an example website which is displayed and managed by the system in accordance with an embodiment.

It is preferred that after the Watch List is populated, the Watch List Manager component 239 manages the Watch List which is displayed on the user's computer via I/O device 258. It is preferred that the Watch List Manager component 239 retrieves and displays the date and time at which the television program is to be broadcast for all future episodes for each program on the user's Watch List. It is preferred that the Watch List Manager component 239 retrieves date and time data from the Broadcast Specific database 248 and/or other databases (e.g. System Proprietary Content database 242, Partner Proprietary Content database 246). The It is preferred that the Watch List Manager component 239 continuously maintains and updates the contents of the Watch List. The Watch List Manager component 239 allows the user to select a date and/or time and automatically displays all television programs that will be broadcast for that date and/or time. The dates shown in the Watch List may be past, present and/or future dates. Additionally, times of broadcast for programs on the Watch List may be past, present and/or future program times. For example, as shown in FIG. 3, the Watch List 302 displays television broadcasted programs and associated times for Yesterday, Today and Tomorrow. However, it is contemplated that the user can view via the Watch List the selected programs to be/have been aired for any past or future date by directly entering a date or choosing a date from a calendar provided on the website.

The Watch List Manager component 239 also preferably displays the channel on which the program will be aired. The broadcast time and channel information would preferably be taken from the Broadcast Specific database 248, whereby the database 248 provides accurate information of broadcast air time and date based on the user's address, type of television programming the user subscribes to (e.g. Comcast, DirecTV, etc.), although this information can be stored internally within the System 200 or another source. Accordingly, the user is able to visit the webpage controlled by the System 200, whereby the user is continuously informed of when and where the programs of interest will be broadcast for a particular date. It is contemplated that the Watch List Manager component 239 allows the user to easily delete and/or modify the programs on the Watch List to customize the Watch List for his or her needs. In an embodiment, the user is able to group and categorize programs on the Watch List based on when or where the programs are broadcasted (e.g. sort by date, time, channel), what type of programs (e.g. live, comedy, sports, drama), the number of friends who have that program on their Watch Lists, most/least watched television programs, most/least commented programs and the like.

It is preferred that the System 200 utilizes the Community Interface component 234 to allow the user to communicate with his or her friends to enrich the experience of using the Network Content System 232. The Community Interface component 234 performs several features which provide a social network like community where users can post comments about viewed content or any other topic on the webpage. The Community Interface component 234 provides the user with the opportunity to notify other users in his or her friend community that he has watched a particular episode of a particular program. In an embodiment, the Community Interface component 234 works with the Content Uploader/Manager component 231 to index or bookmark one or more video frames or timestamps of digital content and refer that indexed frame or timestamp to the user's friends. For example, if the user would like to discuss a particular scene in a video preview or entire episode, he or she can index or bookmark the desired scene at a particular timestamp or frame and forward that bookmarked timestamp or frame to one or more other individuals.

FIG. 3 illustrates a webpage display run by the System 200 in accordance with an embodiment. As shown in FIG. 3, the Watch List of broadcast programs of interest to the user are displayed on the webpage in area 302. In addition, the webpage run by System 200 includes a video view window 304 which preferably includes program and episode information. The webpage preferably includes a comments link 305 as well as "Remove from Watch List" link 307. Webpage includes a recommendations 306 area, a "Play All Previews" button 308, a "Share Watch List" button 310. In addition, the webpage includes options to populate the Watch List by scanning the user's DVR 312 and/or video rental queue 314. In addition, the site 300 includes an option to record the selected program on the user's DVR 317 as well as an option to place the selected program in the user's video rental queue 316.

The Content Uploader/Manager component 231 preferably manages video which is shown in view window 304. As stated, the digital content shown in the view window 304 may be a preview video clip or an entire episode of the television program upon the user selecting the program from the Watch List. In particular, upon the user clicking on the view window 304, the Content Uploader/Manager component 231, the video will proceed to play for the user. The Content Uploader/Manager component 231 preferably has the ability for the user to navigate the video by rewinding, forwarding, pausing and/or stopping the video. It is contemplated that the Content Uploader/Manager component 231 retrieves the content from one or more of the databases illustrated in the Content Server 240. For example, the Content Uploader/Manager component 231 may pull content from the System Proprietary Content database 242 or the Partner Proprietary Content database 246. If the user wishes to view content that is not available on any of the databases in the Content Server 240, the user is then directed to the third party source, such as another website, where that content can be viewed, rented or purchased. It is contemplated that the user may be referred to a video rental service or other vendor to rent or buy that particular episode.

In an embodiment, the Watch List Manager component 239 is configured to allow the user to indicate whether the user has actually watched a particular episode of a television program on the Watch List. In particular to the example shown in FIG. 3, the "I Watched" link 318 allows the user to indicate that he or she has watched that particular episode. In the embodiment in which the user has watched the entire episode in the view window 304, the system may automatically designate that the user has watched the episode upon completion of the episode in the window.

The Watch List Manager component 239 may be configured to work with the Community Interface component 234 to notify the user's friends that he or she had watched the episode. The Community Interface component 234 may send an alert or comment to the user's friends upon the user selecting the "I Watched" link that the user had watched or missed that particular episode. It would be preferred that the system only displays who watched already broadcasted episodes of programs that the users have a common interest in or have chosen to be in their Watch List. Additionally, the Community Interface component 234 would allow the user to be able to view which of the user's friends have also watched a particular common episode from the Watch List. In an embodiment, the user is able to indicate that he or she has not watched the episode or is not even interested in watching that particular episode, whereby such information is provided to the other users.

In an embodiment, whether the user watched/did not watch that particular episode may be tracked by the Monitoring component 228 and provided to an advertiser as an indicator that the user watched or did not watch the commercials broadcasted during that episode. The Community Interface component 234 would also preferably allow comments to be posted between users regarding whether the episode was watched or not. In an embodiment, consumer behavior and trends can be tracked by the Monitoring component 228. Such behavior and trends include, but are not limited to, identifying the most watched programs, identifying most watched episodes for a particular program, the most watched moments in a program (e.g. moments that were rewound repeatedly), comments made by users about a particular episode or program, recommendations by users to add to a particular program to other users' Watch Lists, programs that were in watch lists but not watched, etc. These behaviors and trends can be aggregated and analyzed, whereby such information may be provided to television producers, advertisers, broadcast networks and other interested entities.

The Watch List Manager component 239 may also be configured to work with the Community Interface component 234 to allow the user to post comments and/or ratings in the comments section 316. The comments section may be general to all programs or may be specific to the particular episode that was viewed by the user. Upon the user posting a comment, the system posts the user's comments under the specific episode of the program that has just viewed. The system may be configured to alert the user's friends who have that particular program or episode in their Watch Lists that that particular user has posted a comment. It is also contemplated that the actual content posted by the user be relayed to the user's friends.

Although the above has been described in relation to television programs, it is contemplated that the same may be applied to other content such as, movies, sports, awards programs, highlight reels, video-on-demand content and the like. The system preferably includes a link to allow the user to place the television program or movie into the user's own movie rental queue (e.g. Netflix, Blockbuster, Amazon Video). In particular, for a selected television program, movie or event, the user may click on a movie rental link which then automatically adds the season of that particular program (or individual disc containing that particular episode) to the user's video rental queue. In an embodiment, the system provides a link which allows the user to immediately view the movie rental on the user's computer or television, thereby bypassing the item being added to the user's rental queue.

In an embodiment, the Watch List is able to be exported to one or more other software programs and/or webpages via their own servers/systems 260 via the Partner Website Interface component 237. For example, the system 200 may use the Partner Website Interface component 237 to manually or automatically export the user's Watch List information (e.g. program titles, viewing times, channel) to one or more of the user-subscribed social networking websites (e.g. Facebook, Friendster, MySpace, LinkedIn), whereby the user's friends can view the user's Watch List upon visiting that user's corresponding social networking website (see FIG. 4). In another example, the system may be configured to manually or automatically export the Watch List information to the user's calendaring and/or email system (e.g. Microsoft Outlook, Yahoo Mail) to remind the user that one or more of the user's selected programs from the Watch List are to be broadcast that day.

It is also contemplated that the system is capable of being configured to export information to a mobile electronic device 108 such as a mobile phone, smart-phone, laptop and the like whereby the above features are able to be operated via a widget or online capability via the user's mobile electronic device. In an embodiment, the system allows the user to place a mobile application or widget on the user's mobile electronic device which allows the user to view and manipulate the Watch List via the user's mobile device. For example, the information from the Watch List can be downloaded, sent by SMS, or sent via Twitter to the user's handheld. It is also contemplated that the actual video content may be played and viewed on the user's mobile electronic device.

In an embodiment, the System 200 includes a DVR Manager component 236 (FIG. 2) which allows the user to manage recordings and other features on the user's DVR via the System's 200 website. In particular, the user can select a program on the Watch List and then select a button which on the webpage 300 that automatically sets a recording of the program on the user's DVR. In an embodiment, the System 200 may prompt the user whether to the DVR should be set to record all episodes for the program. If the user confirms that all episodes be recorded, the DVR manager component 236 may instruct the DVR to appropriately set a recording for all episodes. This is preferably done using an API or other code in communication with the webpage which can access the user's DVR or a remote server in communication with the user's DVR. The API may allow the DVR to send a signal back to the DVR Manager component 236 which confirms that the program has been set for recording. It is contemplated that the DVR Manager component 236 may cancel a set recording on the user's DVR in the same manner. In an embodiment, the DVR Manager component 236 synchronizes the watch status of each episode between the DVR and the user's Watch List. For instance, if the user watches the program on the DVR, the DVR Manager component 236 automatically updates the watch status as the user has watched the program on the webpage 300. In another instance, if the user watches the program via the video window 304 or by the user affirmatively indicating he or she has watched the program (i.e. "I Watched" button), the DVR Manager component 236 automatically notifies the DVR that the user has watched the program. In this case, the System 200 may ask the user if he or she would like to erase the recorded program from the DVR's hard drive. The update may be done by the DVR Manager component 236 pinging the DVR and awaiting a confirmation or by the DVR automatically sending a confirmation signal to the DVR Manager component 236.

In an embodiment in which the System 200 is able to access and retrieve information from a user's DVR for purposes of populating the Watch List, it is contemplated that the Monitoring component 228 may also be able to monitor and track information of the user's behavior while watching a recorded television program on the DVR. In particular, the DVR Manager component 236 along with the Monitoring component 228 may monitor the user's viewing behavior while watching a program on the user's DVR which happens to be in the user's Watch List. For instance, the System 200 can gain insight on the user if the user watches a program or commercial multiple times or if the user rewinds or fast forwards through a portion of the content. With regard to rewinding and fast forwarding of content, the Monitoring component 228 along with the DVR Manager component 236 may also track and identify which portions of the actual content was rewound or forwarded through. The Monitoring component 228 can provide such information which could be ultimately useful for producers, broadcast networks, movie studios and/or advertisers as to what viewers find appealing or non-appealing and may be used to improve the actual content.

The functionality of the above components and databases can be accessed in various ways in different embodiments. For example, the user may have physical access to the Computing System 200, and if so, can interact with the various I/O devices 214 to provide and/or receive information. Alternatively, users can use client computer systems to directly access the system, such as remotely via network 280 (e.g., via the Internet and/or the World Wide Web). Such users can use software or other functionality provided on the client computer systems, such as browser 256, to interact with system 232.

Figure 4:
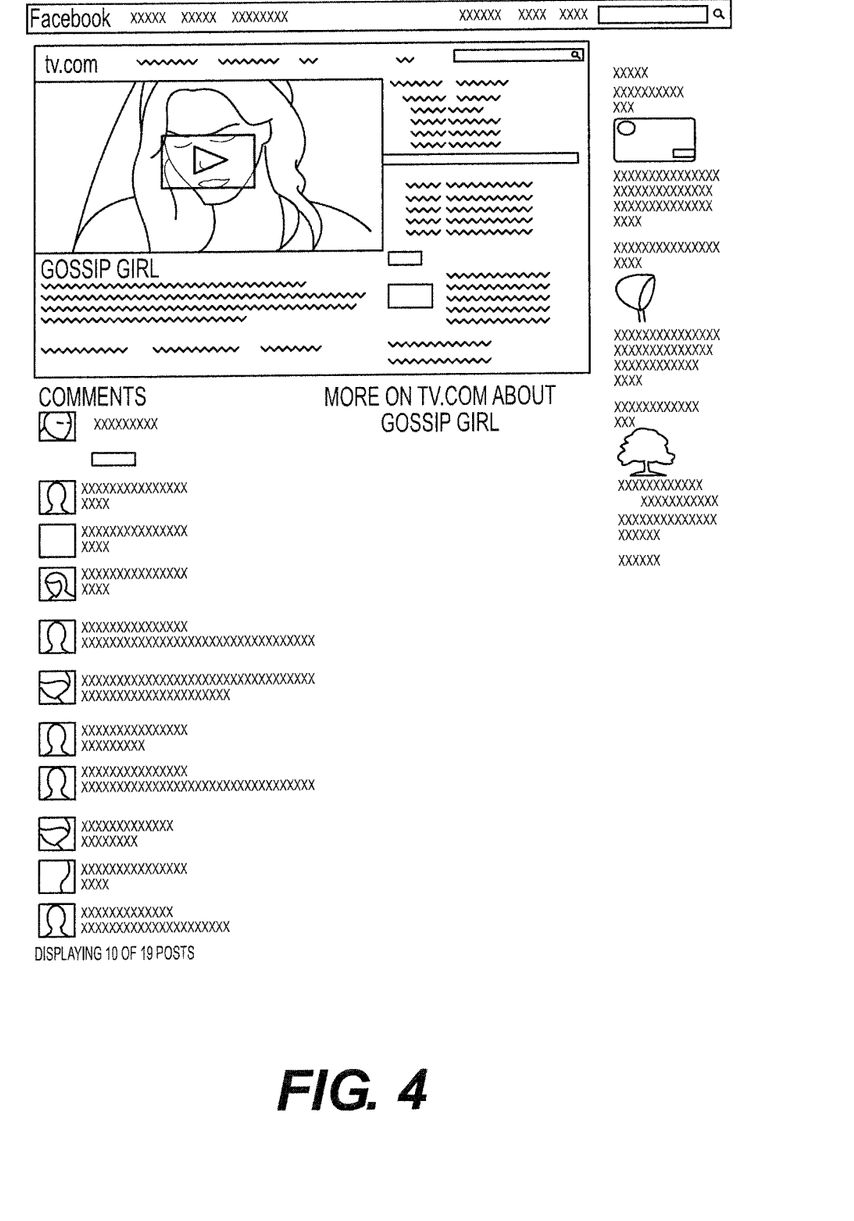
FIG. 4 illustrates an example third party website which is managed by the system in accordance with an embodiment.

FIG. 4 illustrates a method of establishing and managing the user's experience using the System 200 in accordance with an embodiment. It should be noted that the method described below is an example and is not necessarily limiting as additional and/or different steps may be incorporated while maintaining the novelty of the present system. It should also be noted that some steps are optional or occur at times different than that described in the example below. As shown in FIG. 4, upon the user establishing an account with the System (400), the System prompts the user to identify friends who are already members or invite friends to join the network. Upon the user establishing a social network on the system (402), the System may request user authorization to scan one or more sources (e.g. cookies, DVR, video rental queue, social networking sites and the like) to retrieve programs (404). Additionally or alternatively, the System requests the user to directly type in the names of programs which the user would like to add to the Watch List (406). If authorized, the System scans these sources to identify programs which may be of interest to the user to add to the Watch List (408). Thereafter, the System automatically (or first asks confirmation from the user) to populate the Watch List with the programs of interest to the user (410). The System thereafter (or simultaneously) retrieves broadcast dates and times for each of the programs that are added to the Watch List (412) and displays that information on the website preferably run by the System. The System thereafter preferably loads viewing content for each of the programs on the Watch List for use by the user (414). It should be noted that other information and features may be loaded, retrieved and displayed by the System which ultimately are able to be viewed and enjoyed by the user upon accessing the website. It is preferred that the some or all of this information is continually updated by the System to keep the webpage up to date.

Figure 5:
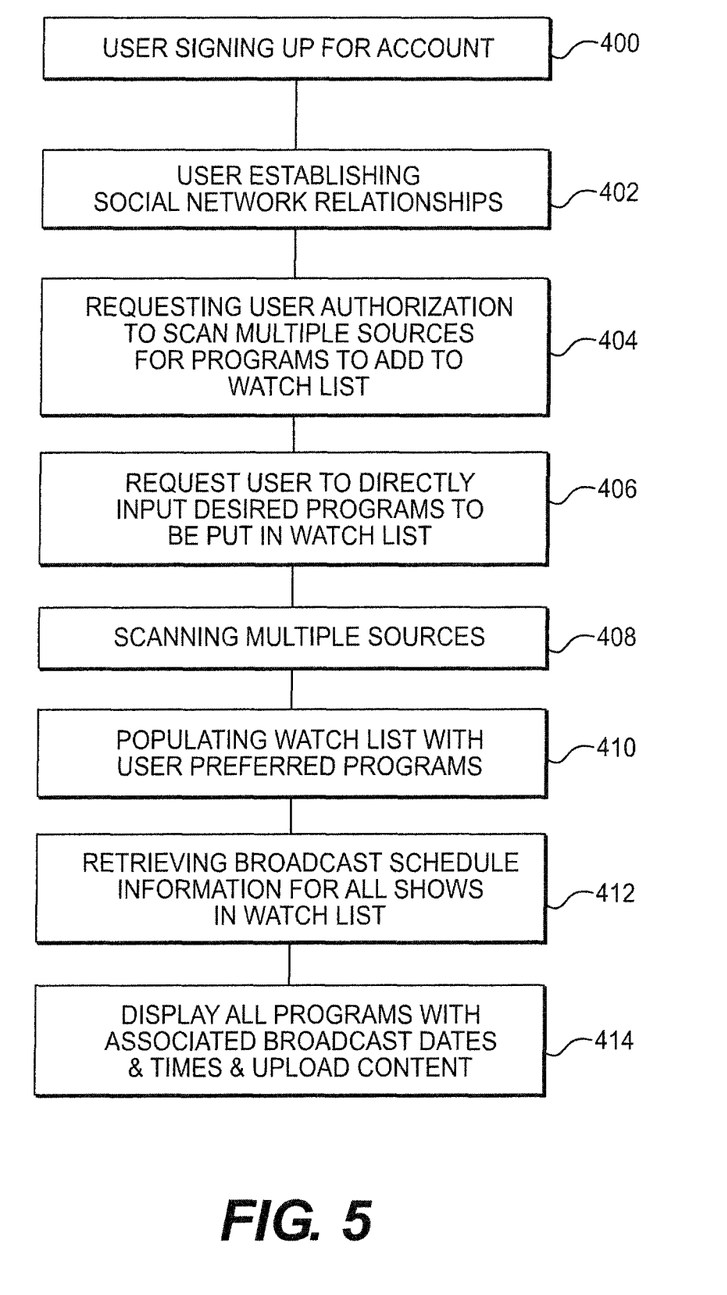
FIG. 5 illustrates a flow chart of the method of operation of the system in accordance with an embodiment.
Figure 6:
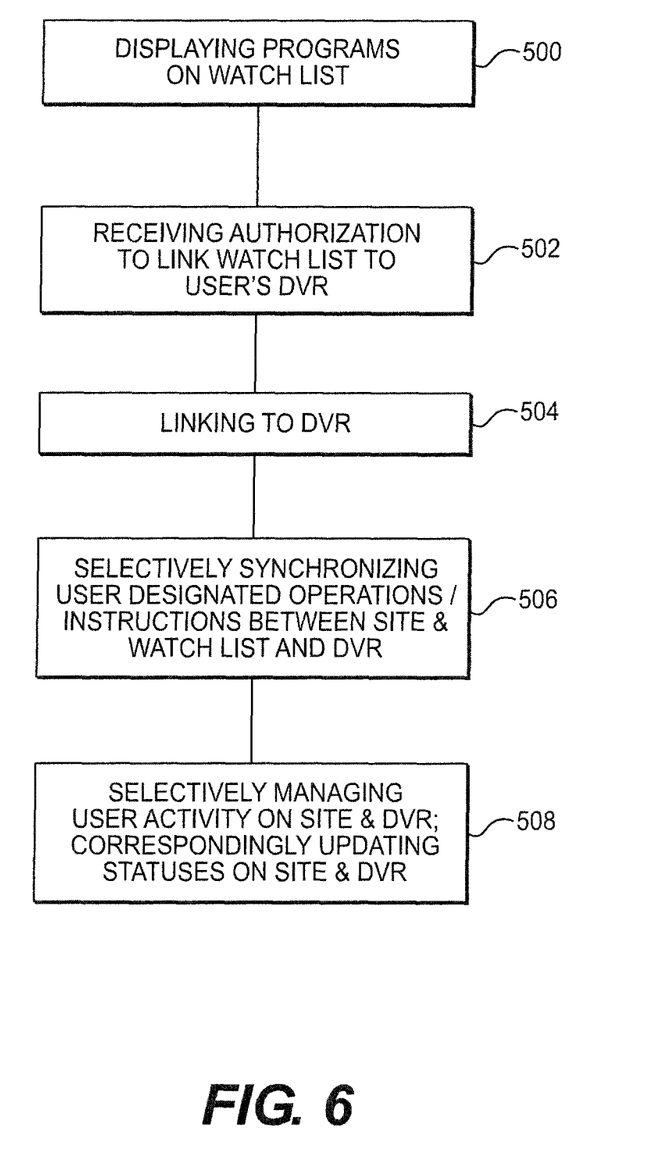
FIG. 6 illustrates a flow chart of another method of operation of the system in accordance with an embodiment.

FIG. 5 illustrates a method of managing the user's DVR in accordance with an embodiment. As shown in FIG. 5, the System displays all programs of interest to the user in the Watch List (500). The System may request the user to authorize the System to link up and establish communication with the user's DVR or DVR service (502). If authorized, the System links with the user's DVR or DVR service (504) and continuously synchronizes the user's viewing habits and activities between the DVR and the site to ensure up-to-date management of the contents in the Watch List as well as the programs stored on the DVR (506).

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method comprising:
generating, using a computer system, a list of recommended television programs for display on a website to a user, the list of recommended television programs on the list generated based on captured interactions of the user with television programs at:
the website;
a digital video recorder (DVR) operated by the user and accessed using the computer system;
a social network frequented by the user and accessed using the computer system; and
a third party video rental queue system frequented by the user and accessed using the computer system; and
wherein the recommended television programs on the list are selected based on date and time broadcast information retrieved from a storage medium, the list including television programs only to be broadcast proximate a particular user selected date, and
wherein generating the list of recommended television programs includes at least one of: identifying most watched episodes for a particular series of related television programs, identifying most watched moments in a television program, identifying comments made by users on the website about a particular television program, identifying suggestions by users to add to a particular program to other users' lists of recommended television programs, and identifying television programs that were in lists of recommended television programs but not watched;
transmitting, to the user's DVR, instructions for recording one or more of the television programs on the list at the future date and time specified in the broadcast information; and
retrieving, from the DVR by the computer system, video data corresponding to recorded television programs for presentation to the user via the website.

2. The method of claim 1, further comprising providing the list to a selected other user designated by the user, wherein the list is viewable by the selected other user.

3. The method of claim 1, further comprising detecting whether the user watched a given television program on the list and changing a watch status of the given television program on the list to indicate that the given television program was watched.

4. The method of claim 3, further comprising updating a popularity metric associated with the given television program based on the watch status.

5. The method of claim 1, further comprising changing a watch status of the one or more television programs on the list on the DVR based on an indication from the user on the website that the one or more television programs was watched by the user.

6. The method of claim 1, further comprising notifying one or more selected other users within the social network of the indication that the one or more identified broadcast programs was watched by the user.

7. The method of claim 1, further comprising automatically uploading a digital version of at least one of the television programs on the list and recorded by the DVR, wherein the digital content is selectively viewable by the user.

8. The method of claim 1, further comprising receiving a comment from the user regarding one or more television programs and posting the comment on the website.

9. The method of claim 1, further comprising displaying an associated channel in the list for each television program in the list.

10. A method comprising:
accessing a user's digital video recorder (DVR) from a computer system to identify a first plurality of television programs based on captured interactions of the user with television programming;
accessing a social network frequented by the user to identify a second plurality of television programs associated with the user in the social network based on captured interactions of the user within the social network;
accessing a user's video rental queue to identify a third plurality of television programs;
identifying a set of television programs of interest to the user based on the pluralities of television programs identified from the user's DVR, the social networking interactions of the user, and the user's video rental queue, wherein identifying the set of television programs of interest to the user based on the interactions includes at least one of identifying most watched episodes for a particular series of related television programs, identifying most watched moments in a television program, identifying comments made by users on the website about a particular television program, identifying suggestions by users to add to a particular program to another users' list of recommended television programs, and identifying television programs that were in lists of recommended television programs but not watched;

retrieving future date and time broadcast information for the set of television programs determined to be of interest to the user;

transmitting, to the user's DVR, instructions for recording one or more of the television programs in the set based on the future date and time broadcast information; and retrieving, from the DVR by the computer system, video data corresponding to recorded television programs for presentation to the user via a website.

11. The method of claim 10, further comprising providing the set of television programs of interest to the user to a selected other user designated by the user, wherein the set is viewable by the selected other user.

12. The method of claim 10, further comprising detecting whether the user watched a given television program in the set of television programs of interest to the user and changing a watch status of the given television program to indicate that the given television program was watched.

13. The method of claim 12, further comprising updating a popularity metric associated with the given television program based on the watch status.

14. The method of claim 10, further comprising changing a watch status of the one or more television programs on the set of television programs of interest to the user on the DVR based on an indication from the user on the website that the one or more television programs was watched by the user.

15. The method of claim 10, further comprising notifying one or more selected other users within the social network of the indication that the one or more identified broadcast programs was watched by the user.

16. The method of claim 10, further comprising automatically uploading a digital version of at least one of the television programs on the set of television programs of interest to the user and recorded by the DVR, wherein the digital content is selectively viewable by the user.

17. The method of claim 10, further comprising receiving a comment from the user regarding one or more television programs and posting the comment on the website.

18. The method of claim 10, further comprising displaying an associated channel in the set of television programs of interest to the user for each television program in the set.

* * * * *